United States Patent
Kumar et al.

(10) Patent No.: US 9,107,217 B2
(45) Date of Patent: Aug. 11, 2015

(54) APPARATUS AND METHOD FOR PROCESSING AN UNRECOVERABLE ERROR DURING RE-ESTABLISHMENT OF AN RLC ENTITY IN A MOBILE COMMUNICATION SYSTEM

(75) Inventors: Vijayant Kumar, Neubiberg (DE); Ki-Hyun Do, Gyeonggi-do (KR); Tae-Hee Lee, Seoul (KR); Prashant Ashok Chitare, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 13/349,095

(22) Filed: Jan. 12, 2012

(65) Prior Publication Data

US 2012/0195185 A1    Aug. 2, 2012

(30) Foreign Application Priority Data

Jan. 12, 2011 (KR) ........................ 10-2011-0003027

(51) Int. Cl.
   *G01R 31/08* (2006.01)
   *H04W 76/04* (2009.01)
   *H04L 1/16* (2006.01)
   *H04W 76/06* (2009.01)

(52) U.S. Cl.
   CPC ........... *H04W 76/046* (2013.01); *H04L 1/1607* (2013.01); *H04W 76/06* (2013.01)

(58) Field of Classification Search
   USPC ......................................................... 370/216
   See application file for complete search history.

(56) References Cited

U.S. PATENT DOCUMENTS

| | | | |
|---|---|---|---|
| 2003/0157927 A1* | 8/2003 | Yi et al. | 455/411 |
| 2003/0207702 A1* | 11/2003 | Chen | 455/574 |
| 2008/0064390 A1* | 3/2008 | Kim | 455/425 |
| 2009/0264127 A1* | 10/2009 | Chun et al. | 455/435.2 |
| 2010/0027413 A1* | 2/2010 | Park et al. | 370/216 |
| 2011/0021154 A1* | 1/2011 | Marinier et al. | 455/67.11 |
| 2013/0003523 A1* | 1/2013 | Singh et al. | 370/216 |

FOREIGN PATENT DOCUMENTS

EP    1689130 A1 *  8/2006  ............. H04L 12/56

\* cited by examiner

*Primary Examiner* — Omar Ghowrwal
*Assistant Examiner* — Angel Brockman
(74) *Attorney, Agent, or Firm* — The Farrell Law Firm, P.C.

(57) ABSTRACT

A mobile communication system and method for processing an unrecoverable error of a terminal are provided. In the method a Radio Resource Control (RRC) layer receives a downlink reset message from a network, determines whether the RRC layer receives an unrecoverable error report from a Radio Link Control (RLC) layer during a downlink reset; transmits an uplink response message to the network, when the downlink reset is completed; determines whether an unrecoverable error ignore condition is met, when the RRC layer receives the unrecoverable error report; and ignores the unrecoverable error when the unrecoverable error ignore condition is met. The RLC layer then performs data transmission and reception.

12 Claims, 5 Drawing Sheets

APPARATUS AND METHOD FOR PROCESSING AN UNRECOVERABLE ERROR DURING RE-ESTABLISHMENT OF AN RLC ENTITY IN A MOBILE COMMUNICATION SYSTEM

PRIORITY

This application claims priority under 35 U.S.C. §119(a) to Korean Patent Application Serial No. 10-2011-0003027, which was filed in the Korean Intellectual Property Office on Jan. 12, 2011, the entire disclosure of which is hereby incorporated by reference.

BACKGROUND OF THE INVENTION

1. Field of the Invention

The present invention relates generally to a mobile communication system, and more particularly, to an apparatus and a method for processing an unrecoverable error in a Radio Link Control (RLC) of a terminal.

2. Description of the Related Art

A Radio Bearer (RB) is used for conveying control plane data and user plane data on a Uu interface. The RB is classified into two types; a signaling RB and a data RB.

The signaling RB conveys control plane data and corresponds to an RB IDentifier (RBID) (0, 1, 2, 3, 4). In addition, the RBID (0, 1, 2, 3, 4) is classified depending on a service mode, where RBID 0 relates to a Transparent Mode (TM), RBID 1 relates to an Unacknowledged Mode (UM), and RBIDs 2, 3, and 4 relate to Acknowledged Modes (AM). Here, in AM, an ACKnowledgement (ACK) is transmitted to an object entity with respect to a Protocol Data Unit (PDU).

The data RB conveys user plane data and corresponds to RBIDs 5 to 32. In these RBIDs, any mode (AM, UM, or TM) is possible depending on network settings.

When a terminal receives a downlink reset message and resets a lower layer, it is often detected by a Radio Resource Control (RRC) layer that an RLC layer transmits an unrecoverable error.

Even in this case, when the reset is completed, the terminal transmits a response message to a network, which wastes data, because the RRC layer should process the unrecoverable error and so an exclusive connection release is required, which represents that data transmission is instantaneously disconnected.

To recover the unrecoverable error, the RRC layer transmits a cell update message to a counterpart node and then receives a cell update confirm message. Thereafter, the RLC layer performs synchronization with a counterpart RLC layer by performing a re-establishment process with respect to a transmission side and a reception side.

However, this process wastes resources because the same process is simultaneously performed in both the reception side and the transmission side, and because it takes too much time for the terminal to return to an exclusive connection mode.

SUMMARY OF THE INVENTION

The present invention has been designed to address at least the problems and/or disadvantages described above and to provide at least the advantages described below.

Accordingly, an aspect of the present invention is to provide an apparatus and a method for processing an unrecoverable error during re-establishment of an RLC entity in a mobile communication system.

Another aspect of the present invention is to provide an apparatus and method for raising data transmission efficiency by reducing a re-establishment frequency of an RLC entity, thereby reducing resource waste and processing time in a mobile communication system.

In accordance with an aspect of the present invention, a method for processing an unrecoverable error of a terminal in a mobile communication system is provided. The method includes receiving, at a Radio Resource Control (RRC) layer, a downlink reset message from a network, determining whether the RRC layer receives an unrecoverable error report from a Radio Link Control (RLC) layer during a downlink reset, transmitting, at the RRC layer, an uplink response message to the network when the downlink reset is completed, determining whether an unrecoverable error ignore condition is met, when the RRC layer receives the unrecoverable error report, ignoring, at the RRC layer, the unrecoverable error when the unrecoverable error ignore condition is met; and performing, at the RLC layer, data transmission and reception.

In accordance with another aspect of the present invention, an apparatus for a terminal that has processed an unrecoverable error in a mobile communication system is provided. The apparatus includes a Radio Resource Control (RRC) layer that receives a downlink reset message from a network, determines whether an unrecoverable error report is received during a downlink reset, transmits an uplink response message to the network when the downlink reset is completed, determines whether an unrecoverable error ignore condition is met when the unrecoverable error report is received, and ignores the unrecoverable error when the unrecoverable error ignore condition is met, and a Radio Link Control (RLC) layer for, reporting an unrecoverable error occurrence to the RRC layer when an unrecoverable error occurrence condition is met, and performing data transmission and reception with the network.

In accordance another aspect of the present invention, a computer-readable recording medium having recorded thereon a program for processing an unrecoverable error of a terminal in a mobile communication system is provided. The computer-readable recording medium includes a first code segment for receiving, at a Radio Resource Control (RRC) layer, a downlink reset message from a network, a second code segment for determining whether the RRC layer receives an unrecoverable error report from a Radio Link Control (RLC) layer during a downlink reset, a third code segment for transmitting, at the RRC layer, an uplink response message to the network when the downlink reset is completed, a fourth code segment for determining whether an unrecoverable error ignore condition is met, when the RRC layer receives the unrecoverable error report, a fifth code segment for ignoring, at the RRC layer, the unrecoverable error when the unrecoverable error ignore condition is met and a sixth code segment for performing, at the RLC layer, data transmission and reception.

In accordance with another aspect of the present invention, an apparatus for a terminal that has processed an unrecoverable error in a mobile communication system is provided. The apparatus includes means for receiving, at a Radio Resource Control (RRC) layer, a downlink reset message from a network, means for determining whether the RRC layer receives an unrecoverable error report from a Radio Link Control (RLC) layer during a downlink reset, means for transmitting, at the RRC layer, an uplink response message to the network when the downlink reset is completed, means for determining whether an unrecoverable error ignore condition is met when the RRC layer receives the unrecoverable error report, means for ignoring, at the RRC layer, the unrecoverable error when the unrecoverable error ignore condition is met and means for performing, at the RLC layer, data transmission and reception.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, an apparatus and a method are provided for processing an unrecoverable error during re-establishment of an RLC entity in a mobile communication system.

When an RLC layer of a terminal re-transmits a maximum number of reset PDUs as set by a MaxRST value, a reset procedure ends and the RLC entity informs an RRC layer of an unrecoverable error.

The RLC layer of the terminal is divided into a transmission part (upward) and a reception part (downward) in an AM mode. The transmission part receives an RLC Service Data Unit (SDU) from an upper layer via an AM-Service Access Point (SAP). The RLC SDU is segmented with an AM-Data (AMD) PDU of a fixed length or concatenated. When a received RLC SDU is greater than a possible size at the AMD PDU, segmentation is performed. The size of the uplink AMD PDU is a semi-fixed value set by an upper layer and may be changed via re-establishment of an AM RLC entity by the upper layer.

The reception part receives an AMD PDU (a PDU including user data) and a control PDU (a PDU including a transmission state of user data) via a logical channel set by a lower layer.

When an RLC PDU is set to a fixed length, a downlink AMD PDU size becomes a semi-fixed value set by an upper layer and may be changed via re-establishment of an AM RLC entity by the upper layer.

When the downlink AMD PDU size is not set, an AMD PDU size is determined after a first PDU is received. A downlink AMD PDU size and an uplink AMD PDU size may be different or may be the same.

An RLC reset is used for resetting two RLC entities in an AM mode.

Figure 1:
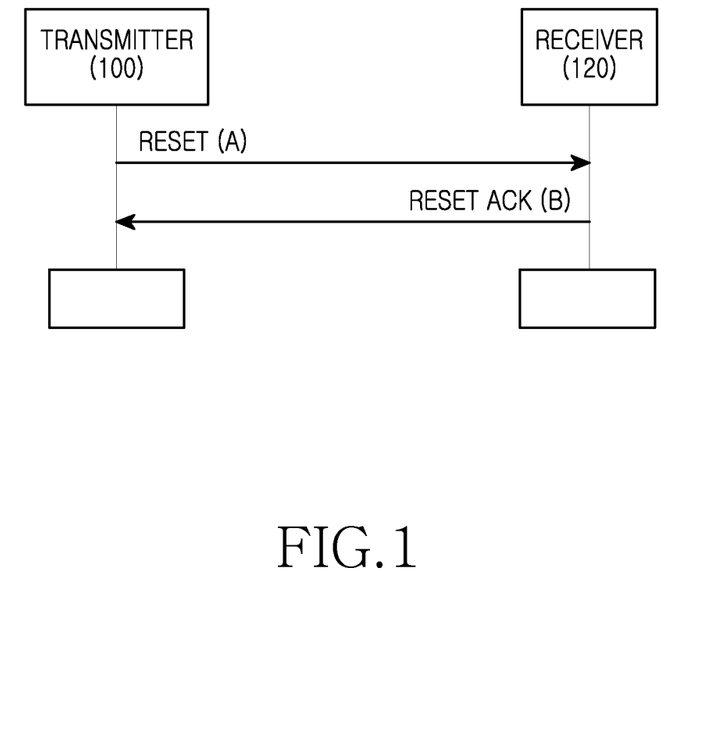
FIG. 1 is a signal flow diagram illustrating an RLC reset procedure according to an embodiment of the present invention.

FIG. 1 is a signal flow diagram illustrating an RLC reset procedure according to an embodiment of the present invention.

Referring to FIG. 1, during a reset procedure, a Hyper Frame Number (HFN) is synchronized between a receiver (e.g., a serving base station) 120 and a transmitter (e.g., a terminal) 100. For encryption, two HFNs are synchronized, i.e., a DownLink (DL) HFN and an UpLink (UL) HFN.

After a reset procedure starts, when a relevant reset PDU transmitted in step A) receives a reset ACK PDU in step B, which has the same Reset Sequence Number (RSN), a reset procedure ends.

During the reset procedure, an RLC layer in a transmission part uses a highest UL HFN and a highest DL HFN. A reset PDU and a reset ACK PDU have a higher priority than an AMD PDU.

When the RLC reset procedure starts, i.e., when a reset PDU it transmitted, the RLC layer increases a counter value Video Telephony (VT) ReSeT (RST) by 1.

When VT (RST) is equal to MaxRST (i.e., a maximum value), the RLC layer stops an RLC reset procedure currently in progress and stops a reset timer Timer_RST, when the reset timer is in operation. Thereafter, the RLC layer reports an unrecoverable error occurrence to an upper layer.

When VT (RST) is less than MaxRST, the RLC layer sends a reset PDU to a lower layer and starts the reset timer Timer_RST. Here, when the timer Timer_RST expires, an RLC reset PDU is retransmitted.

In a Universal Mobile Telephone System (UMTS), an RB characteristic may change during a connection.

For example, when an RLC PDU size changes in a received downlink message, RLC entity re-establishment is required. This RLC entity re-establishment may be classified into three types; re-establishment of a transmission entity, re-establishment of a reception entity, and re-establishment of transmission and reception entities.

When an uplink RLC PDU size changes and a "one sided RLC re-establishment" Information Element (IE) is set to TRUE, RLC entity re-establishment is required.

When a downlink RLC PDU size changes and a "one sided RLC re-establishment" IE is set to TRUE, RLC entity re-establishment is required.

When uplink and downlink RLC PDU sizes change and a "one sided RLC re-establishment" IE is set to FALSE, RLC entity re-establishment is required.

An RLC re-establishment procedure is performed upon request of an upper layer, and may be performed with respect to an AM mode and an UM mode. In the UM mode, an entire RLC re-establishment procedure including both transmission and reception is performed. However, in the AM mode, either the entire RLC re-establishment procedure, or an RLC re-establishment procedure of one side of transmission or reception may be performed by an upper layer.

When the RLC re-establishment procedure of one side of transmission or reception is performed, a relevant variable is initialized and a settable variable is set to a set value. In addition, an HFN of one side of transmission or reception is set to a value determined by an upper layer.

When detecting an unrecoverable error with respect to a data RB (RBID>4) while re-establishing an RLC entity with respect to data RBs of both a reception side and a transmission side using a downlink reset message in a CELL_Dedicated CHannel (DCH) or a CELL_Forward Access CHannel (FACH) state of the AM mode, an RRC layer re-establishes an RLC entity, transmits an uplink response message, and processes an unrecoverable error.

When receiving an unrecoverable error from an RLC layer, the RRC layer generates a cell update message and transmits the cell update message to a network. Additionally, the RRC layer sets an FACH resource, and transitions to a CELL_FACH state. In addition, the RRC layer sets a cause to an unrecoverable error, and sets an "AM RLC indication (RBID>4)" IE to TRUE or FALSE.

The "AM RLC indication (RBID>4)" IE is set based on a Signaling RB (SRB) or a Data RB (DRB) where an unrecoverable error has occurred.

A network (i.e., a control station) that has received the cell update message identifies the "AM RLC indication (RBID>4)" IE. When the "AM RLC indication (RBID>4)" IE is set to TRUE, the network transmits a cell update confirm message to a terminal.

An "RLC re-establish indicator (RB2, RB3, and RB4)" in the cell update confirmation message may be set to TRUE. In this case, a relevant RLC entity of the network (i.e., a control station) should be re-established.

When receiving a downlink reset message, an RRC layer of the terminal determines an RLC PDU size, and compares the RLC PDU size with a currently set RLC PDU size. When the RLC PDU size is different from the currently set RLC PDU size, the RRC layer of the terminal sets a "one sided RLC re-establishment" IE value to FALSE. Thereafter, the RRC layer provides an RLC re-establish primitive to the RLC layer together with a specific HFN.

Thereafter, re-establishment of an RLC entity is performed. Specifically, the RLC layer resets all variables, initializes an HFN to an HFN provided by the RRC layer, and reports a re-establishment confirmation to the RRC layer.

When all layer setting has been performed successfully, the RRC layer transmits an uplink response message to the network. The uplink response message includes an HFN set to a "start value" IE.

When receiving the uplink response message, the network responds the same HFN with respect to an RLC entity. In this case, RLC entities of the terminal and the network are synchronized.

Figure 2:
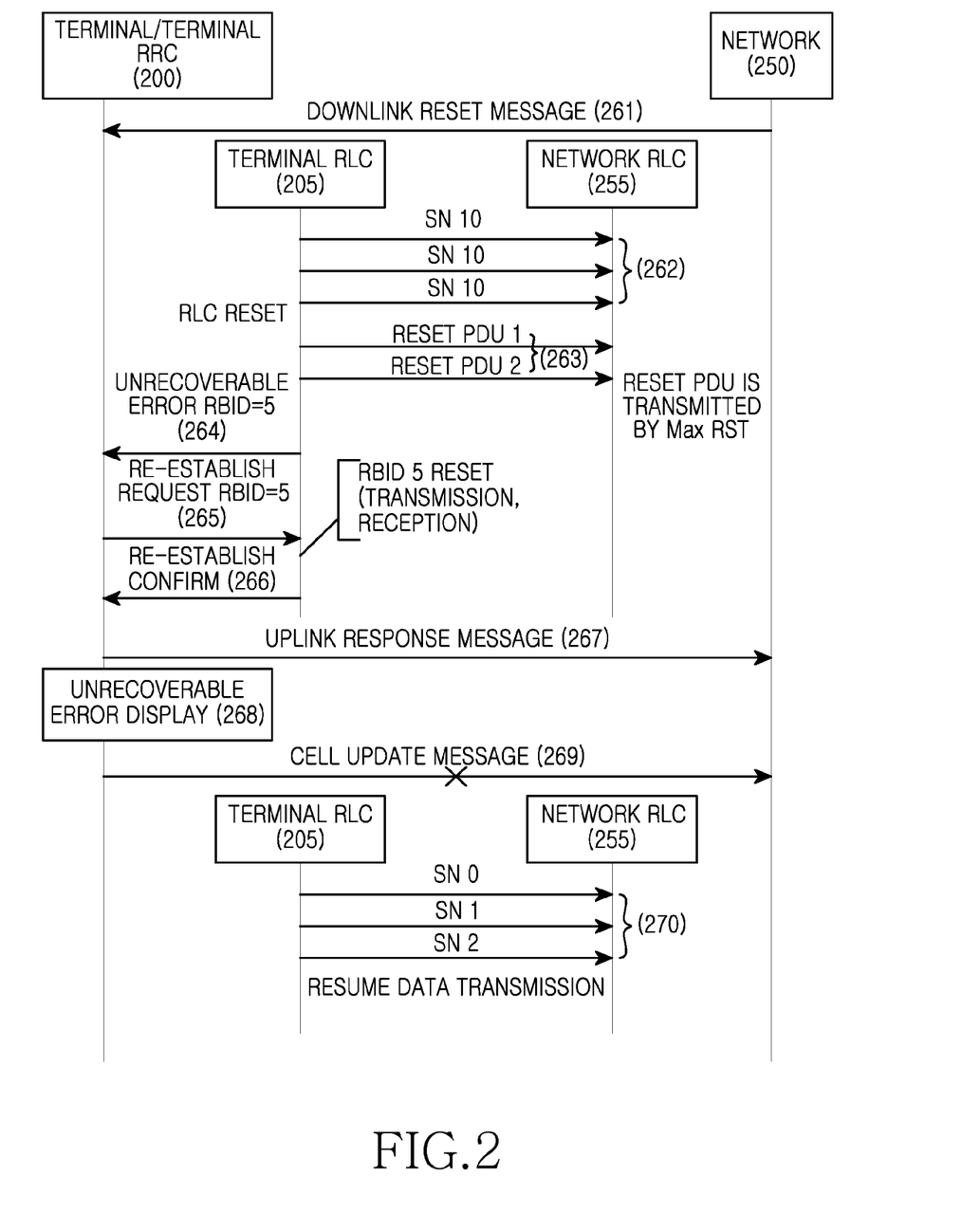
FIG. 2 is a signal flow diagram illustrating a procedure for processing an unrecoverable error according to an embodiment of the present invention.

FIG. 2 is a signal flow diagram illustrating a procedure for processing an unrecoverable error according to an embodiment of the present invention.

Referring to FIG. 2, a terminal 200 receives a downlink reset message from a network 250 in step 261, and an RRC layer 200 of the terminal performs a downlink reset.

Data transmission/reception is performed between an RLC layer 205 of the terminal 200 and an RLC layer 255 of the network 250 in step 262. However, as illustrated in FIG. 2, the RLC layer 205 of the terminal 200 does receive a response, even after transmitting a reset PDU by MaxRST in step 263. Accordingly, the RLC layer 205 informs the RRC layer 200 of an unrecoverable error occurrence in step 264.

In step 265, the terminal RLC 205 receives a re-establish request from the RRC layer 200, and in step 266, transmits a confirmation message to the terminal 200.

Here, the unrecoverable error may occur when synchronization is not matched between the RLC layer 205 of the terminal 200 and the RLC layer 255 of the network 250.

When the downlink reset is completed, the RRC layer 200 of the terminal transmits an uplink response message to an RRC layer of the network 250 in step 267.

In this case, the RRC layer 200 of the terminal ignores an unrecoverable error in step 268, and does not transmit a cell update message to the RRC layer of the network 250 in step 269.

In step 270, the RLC layer 205 of the terminal 200 and the RLC layer 255 of the network 250 start data transmission.

Figure 3:
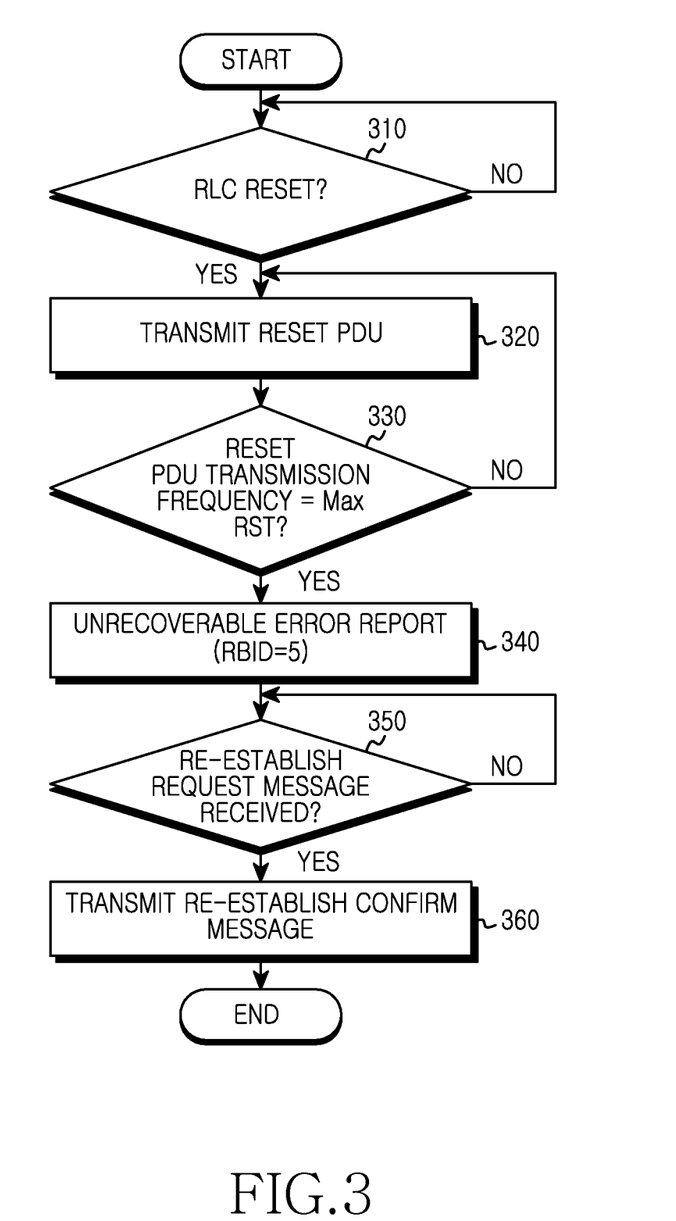
FIG. 3 is a flowchart illustrating a method for processing an unrecoverable error by an RLC layer according to an embodiment of the present invention.

FIG. 3 is a flowchart illustrating a method for processing an unrecoverable error by an RLC layer according to an embodiment of the present invention.

Referring to FIG. 3, when an RLC reset occurs in step 310, an RLC layer of a terminal transmits a reset PDU to a counterpart RLC layer in step 320.

When a reset PDU transmission frequency is equal to a threshold (MaxRST), the RLC layer reports an unrecoverable error occurrence to an RRC layer in step 340. Here, it is assumed that the unrecoverable error has occurred for RBID=5.

When receiving an RLC re-establish request from the RRC layer in step 350, the RLC layer transmits a re-establish confirm message to the RRC layer in step 360. In addition, the RLC layer continues to perform a data transmission/reception process (for RBID=5) afterward.

Figure 4:
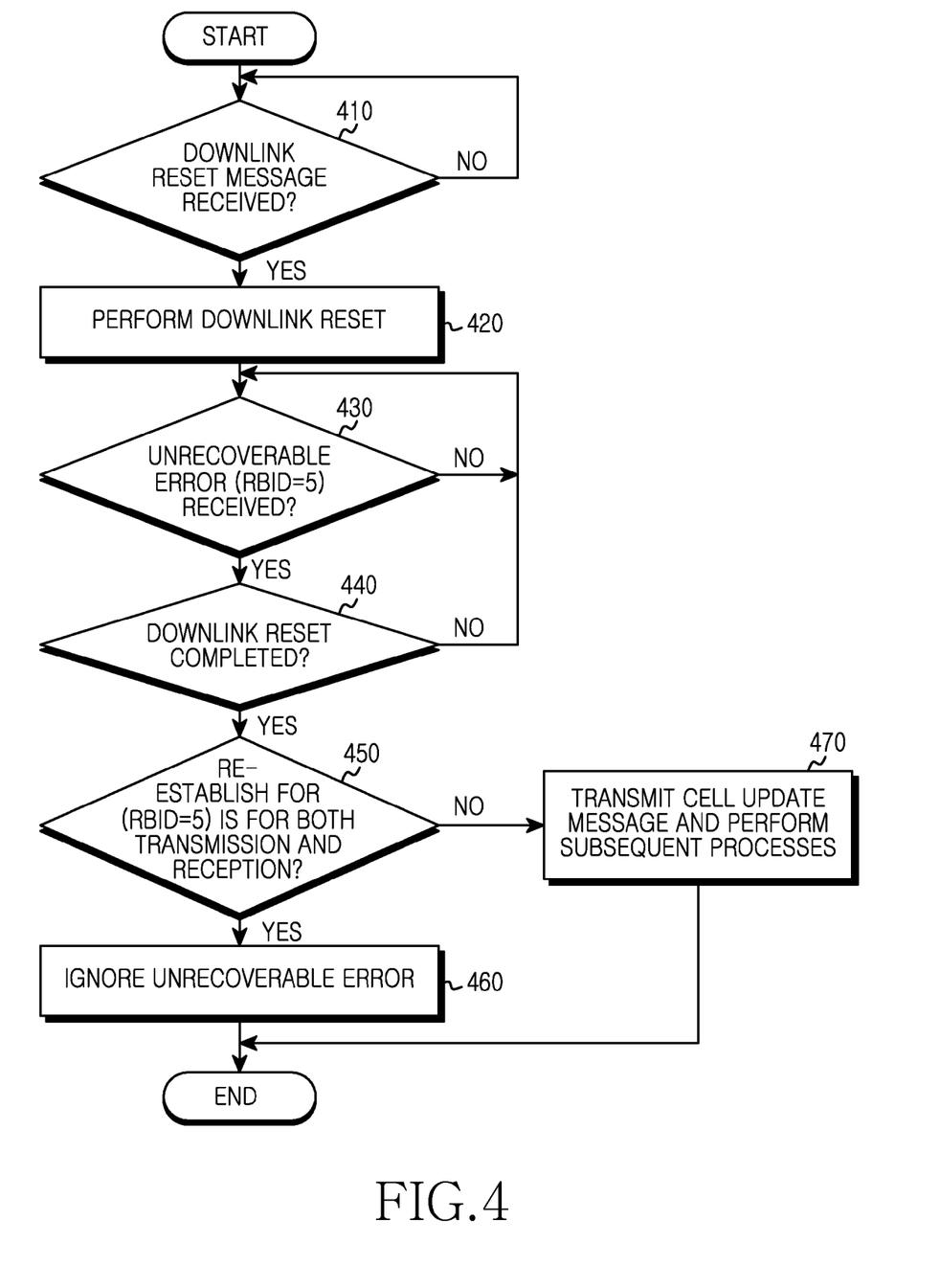
FIG. 4 is a flowchart illustrating a method for processing an unrecoverable error by an RRC layer according to an embodiment of the present invention.

FIG. 4 is a flowchart illustrating a method for processing an unrecoverable error by an RRC layer according to an embodiment of the present invention.

Referring to FIG. 4, when receiving a downlink reset message from a network in step 410, the RRC layer performs downlink reset in step 420.

After receiving an unrecoverable error report (for RBID=5) from an RLC layer in step 430, and when a downlink reset is completed in step 440, the RRC layer determines whether RLC re-establishment for an RLC entity (RBID=5) is for both transmission and reception in step 450.

When the RLC re-establishment is for both transmission and reception in step 450, the RRC layer ignores the unrecoverable error in step 460. However, when the RLC re-establishment is not for both transmission and reception in step 450, the RRC layer transmits a cell update message and performs subsequent processes in step 470.

Figure 5:
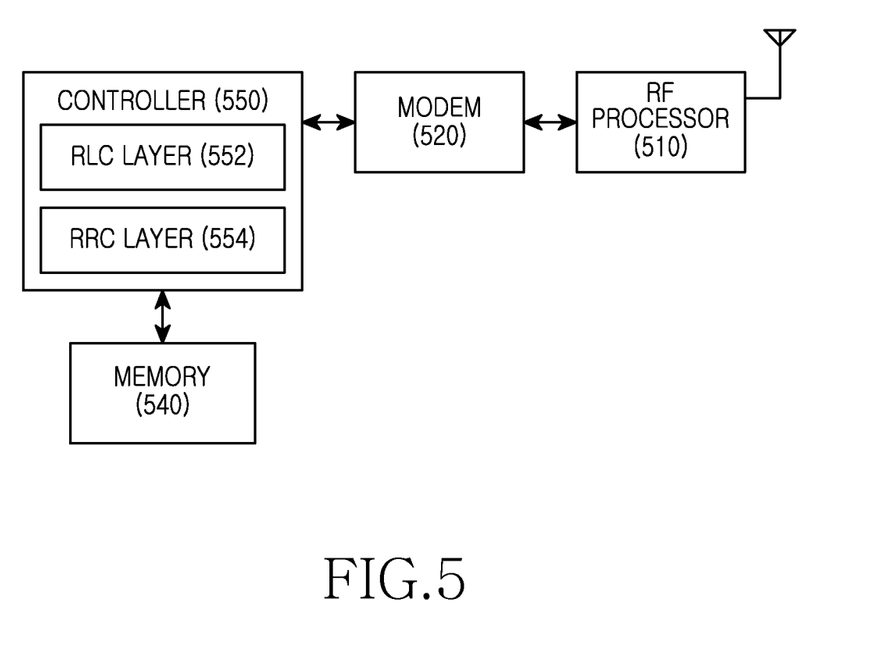
FIG. 5 is a block diagram illustrating a terminal according to an embodiment of the present invention.

FIG. 5 is a block diagram illustrating a terminal according to an embodiment of the present invention.

Referring to FIG. 5, the terminal includes a Radio Frequency (RF) processor 510, a modem 520, a memory 540, and a controller 550.

The controller 550 includes an RLC layer 552 and an RRC layer 554. The RLC layer 552 and the RRC layer 554 may be an RLC entity and an RRC entity, respectively.

The RF processor 510 performs functions for transmitting and receiving signals via an RF channel, such as band conversion and amplification of a signal. That is, the RF processor 510 up-converts a baseband signal provided from the modem 520 into an RF signal and transmits the up-converted signal via an antenna, and down-converts an RF signal received via the antenna into a baseband signal.

The modem 520 performs a conversion function between a baseband signal and a bit line according to a physical layer standard of the system. For example, during data transmission, the modem 520 generates complex symbols by encoding and modulating a transmission bit line, maps the complex symbols to subcarriers, and then configures Orthogonal Frequency Division Multiplexing (OFDM) symbols via Inverse Fast Fourier Transform (IFFT) and Cyclic Prefix (CP) insertion.

In addition, during data reception, the modem 520 divides a baseband signal provided from the RF processor 610 on an OFDM basis, recovers signals mapped to subcarriers via FFT, and then recovers a reception bit line via demodulation and decoding.

The memory 540 stores a basic program for the operation of the terminal, an application program, and data such as user content, etc. In addition, the memory 540 provides stored data in response to a request of the controller 550.

The controller 550 controls overall operations of the terminal. For example, the controller 550 configures uplink data to provide the same to the modem 520, and analyzes downlink data provided from the modem 520.

The RLC layer 552 and the RRC 554 operate as described in the methods of FIGS. 3 and 4, respectively, as described above.

The above-described embodiments of the present invention have an advantage of raising data transmission efficiency by reducing a re-establishment frequency of an RLC entity, thereby reducing resource waste and processing time in a mobile communication system.

Alternate embodiments of the present invention include computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

Although the present invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of a terminal in a mobile communication system, the method comprising:
   receiving, at a Radio Resource Control (RRC) layer of the terminal, a downlink reset message from a network;
   determining whether the RRC layer receives an unrecoverable error report from a Radio Link Control (RLC) layer during a downlink reset;
   transmitting, at the RRC layer, an uplink response message to the network when the downlink reset is completed;
   determining that an unrecoverable error ignore condition is met, when RLC re-establishment according to the unrecoverable error report is for both transmission and reception and when the RRC layer receives the unrecoverable error report;
   ignoring, at the RRC layer, the unrecoverable error without transmitting a cell update message to the network, when the unrecoverable error ignore condition is met; and
   performing, at the RLC layer of the terminal, data transmission and reception.

2. The method of claim 1, further comprising determining that the unrecoverable error ignore condition is met, when a Radio Bearer Identifier (RBID) where the unrecoverable error has occurred represents a data bearer and when the RRC layer receives the unrecoverable error report.

3. The method of claim 1, further comprising transmitting, at the RRC layer, the cell update message to the network, when the unrecoverable error ignore condition is not met.

4. The method of claim 1, wherein the RLC layer reports unrecoverable error occurrence to the RRC layer when the RLC layer is not capable of receiving a reset ACK Protocol Data Unit (PDU).

5. An apparatus for a terminal that processes an unrecoverable error in a mobile communication system, the apparatus comprising:
   a transceiver;
   a Radio Resource Control (RRC) layer controller configured to receive a downlink reset message from a network, determine whether an unrecoverable error report is received during a downlink reset, transmit an uplink response message to the network when the downlink reset is completed, determine that an unrecoverable error ignore condition is met, when Radio Link Control (RLC) re-establishment according to the unrecoverable error report is for both transmission and reception and when the unrecoverable error report is received, and ignore the unrecoverable error without transmitting a cell update message to the network, when the unrecoverable error ignore condition is met; and
   an RLC layer controller configured to report an unrecoverable error occurrence to the RRC layer controller, and perform data transmission and reception with the network using the transceiver.

6. The apparatus of claim 5, wherein the RRC layer controller is further configured to determine that the unrecoverable error ignore condition is met, when a Radio Bearer Identifier (RBID) where an unrecoverable error has occurred represents a data bearer and when the RRC layer controller receives the unrecoverable error report.

7. The apparatus of claim 5, wherein the RRC layer controller is further configured to transmit the cell update message to the network, when the unrecoverable error ignore condition is not met.

8. The apparatus of claim 5, wherein the RLC layer controller is further configured to report the unrecoverable error occurrence to the RRC layer controller, when the RLC layer controller is not capable of receiving a reset ACK PDU.

9. A non-transitory computer-readable recording medium in a controller having recorded thereon a program for processing an unrecoverable error of a terminal in a mobile communication system comprising;
   a first code segment for receiving, by a Radio Resource Control (RRC) layer controller, a downlink reset message from a network;
   a second code segment for determining, by the RRC layer con whether the RRC layer controller receives an unrecoverable error report from a Radio Link Control (RLC) layer controller during a downlink reset;
   a third code segment for transmitting, by the RRC layer controller, an uplink response message to the network, when the downlink reset is completed;
   a fourth code segment for determining, by the RRC layer controller, that an unrecoverable error ignore condition is met, when RLC re-establishment according to the unrecoverable error report is for both transmission and reception and when the RRC layer controller receives the unrecoverable error report;
   a fifth code segment for ignoring, by the RRC layer controller, the unrecoverable error without transmitting a cell update message to the network, when the unrecoverable error ignore condition is met; and a sixth code segment for performing, by the RLC layer controller, data transmission and reception.

10. The computer-readable recording medium of claim 9, wherein the program further comprises a seventh code segment for determining, by the RRC layer controller, that the unrecoverable error ignore condition is met, when a Radio Bearer Identifier (RBID) where the unrecoverable error has occurred represents a data bearer and when the RRC layer controller receives the unrecoverable error report.

11. The computer-readable recording medium of claim 9, wherein the program further comprises a seventh code segment for transmitting, by the RRC layer controller, the cell update message to the network, when the unrecoverable error ignore condition is not met.

12. The computer-readable recording medium of claim 9, wherein the RLC layer controller reports unrecoverable error occurrence to the RRC layer controller, when the RLC layer controller is not capable of receiving a reset ACK Protocol Data Unit (PDU).

\* \* \* \* \*